US011852819B2

United States Patent
Myhre et al.

(10) Patent No.: US 11,852,819 B2
(45) Date of Patent: Dec. 26, 2023

(54) OPTICAL SYSTEMS HAVING MULTIPLE LIGHT PATHS FOR PERFORMING FOVEATION

(71) Applicant: Apple Inc., Cupertino, CA (US)

(72) Inventors: Graham B. Myhre, Campbell, CA (US); Guolin Peng, Sunnyvale, CA (US); Hyungryul Choi, San Jose, CA (US); Scott M. DeLapp, San Diego, CA (US); Vikrant Bhakta, Santa Clara, CA (US)

( * ) Notice: Subject to any disclaimer, the term of this patent is extended or adjusted under 35 U.S.C. 154(b) by 145 days.

(21) Appl. No.: 17/479,322

(22) Filed: Sep. 20, 2021

(65) Prior Publication Data
US 2022/0004009 A1      Jan. 6, 2022

Related U.S. Application Data

(63) Continuation of application No. PCT/US2020/060563, filed on Nov. 13, 2020.
(Continued)

(51) Int. Cl.
*G02B 27/01* (2006.01)
*G02B 27/00* (2006.01)
(Continued)

(52) U.S. Cl.
CPC ..... *G02B 27/0172* (2013.01); *G02B 27/0093* (2013.01); *G02B 27/283* (2013.01); *G02B 27/1066* (2013.01); *G02B 2027/014* (2013.01); *G02B 2027/0138* (2013.01); *G02B 2027/0147* (2013.01)

(58) Field of Classification Search
CPC ............ G02B 27/0093; G02B 27/017; G02B 27/0172; G02B 27/1066; G02B 27/283; G02B 2027/0138; G02B 2027/014; G02B 2027/0147
See application file for complete search history.

(56) References Cited

U.S. PATENT DOCUMENTS 9,711,072 B1      7/2017   Konttori et al.
10,466,489 B1 *  11/2019   Ghazaryan ........... G02B 3/0056
(Continued)

FOREIGN PATENT DOCUMENTS

WO      2020205784 A1      10/2020

*Primary Examiner* — Nitin Patel
*Assistant Examiner* — Cory A Almeida
(74) *Attorney, Agent, or Firm* — Treyz Law Group, P.C.; Michael H. Lyons (57) ABSTRACT

An electronic device may include a display module that produces foveated images having high and low resolution regions. The module may include a reflective display panel that produces first reflected light during first time periods and second reflected light during second time periods. The first reflected light may reflect off of a beam splitter to form the low resolution region of the foveated image. The second reflected light may be transmitted by the beam splitter, de-magnified by a lens, and redirected by an optical steering element to produce the high resolution region at a desired, adjustable, location in the foveated image. The reflective display panel may be replaced by sets of emissive display panels that concurrently display the high and low resolution regions in the foveated image. The sets of emissive display panels may be replaced by front-lit reflective display panels.

20 Claims, 6 Drawing Sheets

Related U.S. Application Data

(60) Provisional application No. 62/939,214, filed on Nov. 22, 2019.

(51) Int. Cl.
  *G02B 27/28* (2006.01)
  *G02B 27/10* (2006.01)

(56) References Cited

U.S. PATENT DOCUMENTS

| | | | |
|---|---|---|---|
| 2003/0058534 A1* | 3/2003 | Scott | G02B 6/2793 359/489.08 |
| 2016/0379606 A1* | 12/2016 | Kollin | G03H 1/0005 345/428 |
| 2018/0284451 A1* | 10/2018 | Eash | G09G 5/026 |

\* cited by examiner

ОПТICAL SYSTEMS HAVING MULTIPLE LIGHT PATHS FOR PERFORMING FOVEATION

This application is a continuation of international patent application No. PCT/US2020/060563, filed Nov. 13, 2020, which claims the benefit of U.S. provisional patent application No. 62/939,214, filed Nov. 22, 2019, which are hereby incorporated by reference herein in their entireties.

BACKGROUND

This relates generally to optical systems and, more particularly, to optical systems for displays.

Electronic devices may include displays that present images close to a user's eyes. For example, devices such as virtual reality and augmented reality headsets may include displays with optical elements that allow users to view the displays.

It can be challenging to design devices such as these. If care is not taken, the components used in displaying content may be unsightly and bulky and may not exhibit desired levels of optical performance.

SUMMARY

An electronic device such as a head-mounted device may have one or more near-eye displays that produce images for a user. The head-mounted device may be a pair of virtual reality glasses or may be an augmented reality headset that allows a viewer to view both computer-generated images and real-world objects in the viewer's surrounding environment.

The near-eye display may include a display module that generates light and an optical system that redirects the light from the display module towards an eye box. The optical system may include a waveguide having an input coupler and an output coupler. The light provided to the eye box may include a foveated image having a high resolution region and a low resolution region. The display module may generate the foveated image and may adjust the location of the high resolution region over time (e.g., so that the high resolution region overlaps the center of the viewer's gaze as the viewer's gaze changes).

The display module may include a light source that produces illumination light, a reflective display panel such as a liquid crystal on silicon (LCOS) or digital micromirror device (DMD) panel, a polarizing beam splitter, a lens, and an optical steering element such as an adjustable mirror or a switchable liquid crystal steering device. The reflective display panel may reflect the illumination light as first reflected light during a first time period and may reflect the illumination light as second reflected light during a second time period. The beam splitter may reflect the first reflected light towards the optical system as the low resolution region of the foveated image but may transmit the second reflected light. The lens may de-magnify the second reflected light transmitted by the polarizing beam splitter to produce de-magnified light. The optical steering element may re-direct the de-magnified light through the beam splitter and towards the optical system as the high resolution region of the foveated image. Control circuitry may adjust the optical steering element to change the location of the high resolution region in the foveated image over time.

In another suitable arrangement, the optical system may include first and second sets of emissive display panels such as micro light-emitting-diode (uLED) display panels, micro organic light-emitting diode (uOLED) display panels, and vertical-cavity surface-emitting laser (VCSEL) array display panels. The first set of emissive display panels may produce first illumination light. The beam splitter may reflect the first illumination light towards the optical system as the low resolution region of the foveated image. The second set of emissive display panels may produce second illumination light. The lens may de-magnify the second illumination light to produce de-magnified light. The optical steering element may re-direct the de-magnified light towards the beam splitter. The beam splitter may transmit the de-magnified light re-directed by the optical steering element towards the optical system as the high resolution region of the foveated image. Control circuitry may adjust the optical steering element to change the location of the high resolution region in the foveated image over time. If desired, the first and second sets of emissive display panels may be replaced with front-lit LCOS display panels.

DETAILED DESCRIPTION

Figure 1:
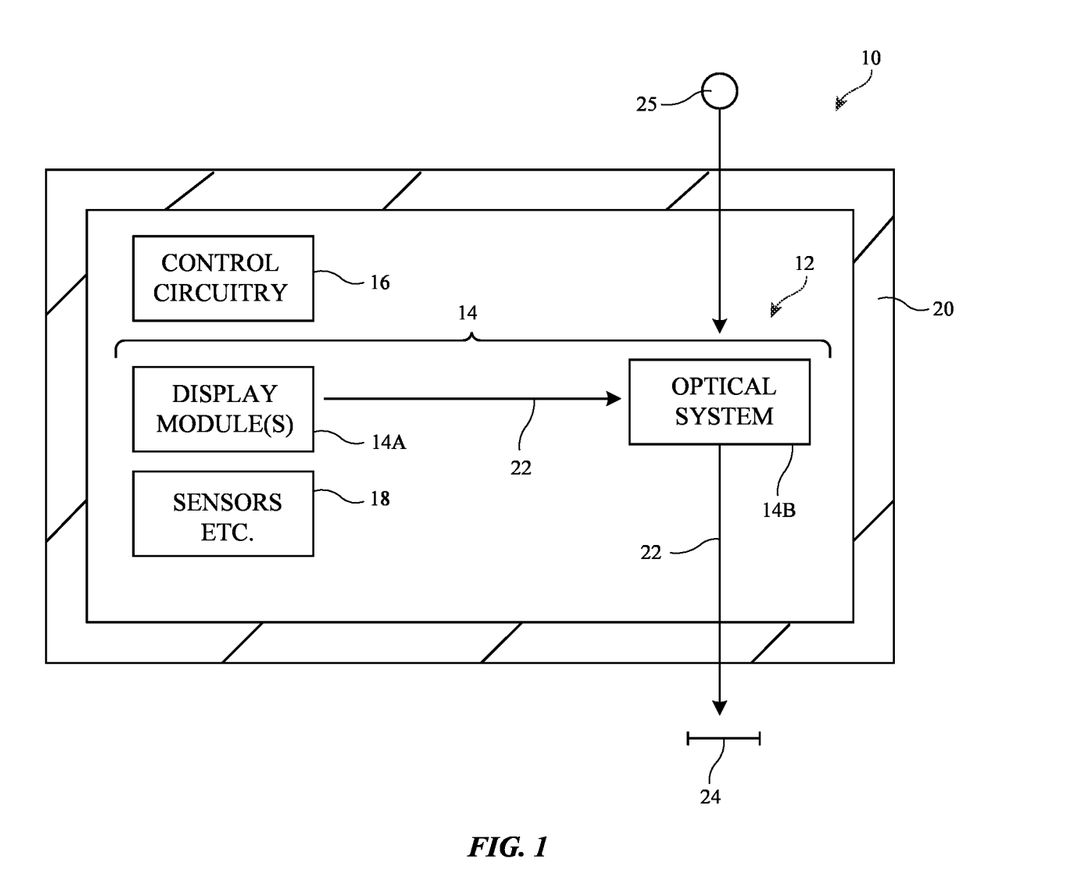
FIG. 1 is a diagram of an illustrative system having a display in accordance with some embodiments.

An illustrative system having a device with one or more near-eye display systems is shown in FIG. 1. System 10 may be a head-mounted device having one or more displays such as near-eye displays 14 mounted within support structure (housing) 20. Support structure 20 may have the shape of a pair of eyeglasses (e.g., supporting frames), may form a housing having a helmet shape, or may have other configurations to help in mounting and securing the components of near-eye displays 14 on the head or near the eye of a user. Near-eye displays 14 may include one or more display modules such as display modules 14A and one or more optical systems such as optical systems 14B. Display modules 14A may be mounted in a support structure such as support structure 20. Each display module 14A may emit light 22 (image light) that is redirected towards a user's eyes at eye box 24 using an associated one of optical systems 14B.

The operation of system 10 may be controlled using control circuitry 16. Control circuitry 16 may include storage and processing circuitry for controlling the operation of system 10. Circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code (instructions) may be stored on storage in circuitry 16 and run on processing circuitry in circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.). In one suitable arrangement that is sometimes described herein as an example, components 18 may include gaze tracking sensors that gather gaze image data from a user's eye at eye box 24 to track the direction of the user's gaze in real time. As an example, the gaze tracking sensors may include infrared or other light emitters that emit infrared light or other light towards the eye box and image sensors that sense the infrared or other light reflected off of the user's eye (e.g., where the sensed light identifies the gaze direction of the user's eye).

Display modules 14A may include reflective displays (e.g., liquid crystal on silicon (LCOS) displays, digital-micromirror device (DMD) displays, or other spatial light modulators), emissive displays (e.g., micro-light-emitting diode (uLED) displays, organic light-emitting diode (OLED) displays, laser-based displays, etc.), or displays of other types. Light sources in display modules 14A may include uLEDs, OLEDs, LEDs, lasers, combinations of these, or any other desired light-emitting components.

Optical systems 14B may form lenses that allow a viewer (see, e.g., a viewer's eyes at eye box 24) to view images on display(s) 14. There may be two optical systems 14B (e.g., for forming left and right lenses) associated with respective left and right eyes of the user. A single display 14 may produce images for both eyes or a pair of displays 14 may be used to display images. In configurations with multiple displays (e.g., left and right eye displays), the focal length and positions of the lenses formed by components in optical system 14B may be selected so that any gap present between the displays will not be visible to a user (e.g., so that the images of the left and right displays overlap or merge seamlessly).

If desired, optical system 14B may contain components (e.g., an optical combiner, etc.) to allow real-world image light from real-world images or objects 25 to be combined optically with virtual (computer-generated) images such as virtual images in image light 22. In this type of system, which is sometimes referred to as an augmented reality system, a user of system 10 may view both real-world content and computer-generated content that is overlaid on top of the real-world content. Camera-based augmented reality systems may also be used in device 10 (e.g., in an arrangement which a camera captures real-world images of object 25 and this content is digitally merged with virtual content at optical system 14B).

System 10 may, if desired, include wireless circuitry and/or other circuitry to support communications with a computer or other external equipment (e.g., a computer that supplies display 14 with image content). During operation, control circuitry 16 may supply image content to display 14. The content may be remotely received (e.g., from a computer or other content source coupled to system 10) and/or may be generated by control circuitry 16 (e.g., text, other computer-generated content, etc.). The content that is supplied to display 14 by control circuitry 16 may be viewed by a viewer at eye box 24.

Figure 2:
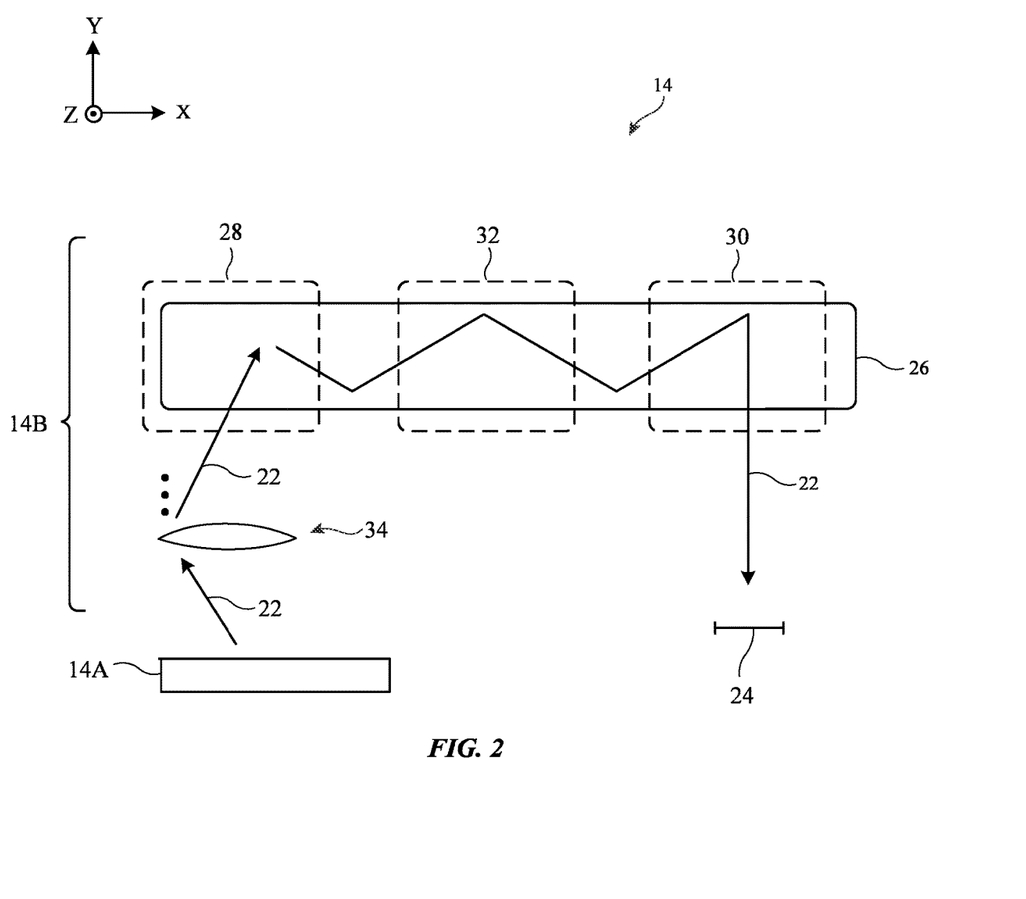
FIG. 2 is a top view of an illustrative optical system having a display module with multiple optical paths for performing dynamic foveation operations in accordance with some embodiments.

FIG. 2 is a top view of an illustrative display 14 that may be used in system 10 of FIG. 1. As shown in FIG. 2, near-eye display 14 may include one or more display modules such as display module 14A and an optical system such as optical system 14B. Optical system 14B may include optical elements such as one or more waveguides 26. Waveguide 26 may include one or more stacked substrates (e.g., stacked planar and/or curved layers sometimes referred to herein as waveguide substrates) of optically transparent material such as plastic, polymer, glass, etc.

If desired, waveguide 26 may also include one or more layers of holographic recording media (sometimes referred to herein as holographic media, grating media, or diffraction grating media) on which one or more diffractive gratings are recorded (e.g., holographic phase gratings, sometimes referred to herein as holograms). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating media may include photopolymers, gelatin such as dichromated gelatin, silver halides, holographic polymer dispersed liquid crystal, or other suitable holographic media.

Diffractive gratings on waveguide 26 may include holographic phase gratings such as volume holograms or thin-film holograms, meta-gratings, or any other desired diffractive grating structures. The diffractive gratings on waveguide 26 may also include surface relief gratings formed on one or more surfaces of the substrates in waveguides 26, gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles).

Optical system 14B may include collimating optics such as imaging optics 34. Imaging optics 34 (sometimes referred to herein as imaging lens 34) may include one or more lens elements that help direct image light 22 towards waveguide 26. If desired, display module 14A may be mounted within support structure 20 of FIG. 1 while optical system 14B may be mounted between portions of support structure 20 (e.g., to form a lens that aligns with eye box 24). Other mounting arrangements may be used, if desired.

As shown in FIG. 2, display module 14A may generate light 22 associated with image content to be displayed to eye box 24. Light 22 may be collimated using a lens such as a lens in imaging optics 34. Optical system 14B may be used to present light 22 output from display module 14A to eye box 24.

Optical system 14B may include one or more optical couplers such as input coupler 28, cross-coupler 32, and output coupler 30. In the example of FIG. 2, input coupler 28, cross-coupler 32, and output coupler 30 are formed at or on waveguide 26. Input coupler 28, cross-coupler 32, and/or output coupler 30 may be completely embedded within the substrate layers of waveguide 26, may be partially embedded within the substrate layers of waveguide 26, may be mounted to waveguide 26 (e.g., mounted to an exterior surface of waveguide 26), etc.

The example of FIG. 2 is merely illustrative. One or more of these couplers (e.g., cross-coupler 32) may be omitted. Optical system 14B may include multiple waveguides that are laterally and/or vertically stacked with respect to each other. Each waveguide may include one, two, all, or none of couplers 28, 32, and 30. Waveguide 26 may be at least partially curved or bent if desired.

Waveguide 26 may guide light 22 down its length via total internal reflection. Input coupler 28 may be configured to couple light 22 from display module 14A (imaging optics 34) into waveguide 26, whereas output coupler 30 may be configured to couple light 22 from within waveguide 26 to the exterior of waveguide 26 and towards eye box 24. For example, display module 14A may emit light 22 in direction +Y towards optical system 14B. When light 22 strikes input coupler 28, input coupler 28 may redirect light 22 so that the light propagates within waveguide 26 via total internal reflection towards output coupler 30 (e.g., in direction X). When light 22 strikes output coupler 30, output coupler 30 may redirect light 22 out of waveguide 26 towards eye box 24 (e.g., back along the Y-axis). In scenarios where cross-coupler 32 is formed at waveguide 26, cross-coupler 32 may redirect light 22 in one or more directions as it propagates down the length of waveguide 26, for example.

Input coupler 28, cross-coupler 32, and/or output coupler 30 may be based on reflective and refractive optics or may be based on holographic (e.g., diffractive) optics. In arrangements where couplers 28, 30, and 32 are formed from reflective and refractive optics, couplers 28, 30, and 32 may include one or more reflectors (e.g., an array of micromirrors, partial mirrors, or other reflectors). In arrangements where couplers 28, 30, and 32 are based on holographic optics, couplers 28, 30, and 32 may include diffractive gratings (e.g., volume holograms, surface relief gratings, etc.).

It may be desirable to display high resolution images using display 14. However, in practice, the human eye may only be sensitive enough to appreciate the difference between higher resolution and lower resolution image data near the center of its field of view (e.g., a user may be less sensitive to low resolution image data in portions of the image at the periphery of the user's field of view). In practice, providing high resolution image data within the entirety of the field of view may consume an excessive amount of processing resources, optical resources, and space within display 14, particularly given that users are only sensitive to high resolution image data near the center of the field of view. Display 14 may therefore be a foveated display that displays only critical portions of an image at high resolution to help reduce the burdens on system 10.

In general, increasing the physical size of display module 14A (e.g., display panel 38 of FIG. 3) will increase the maximum resolution of the images that can be displayed using light 22. However, space is often at a premium in compact systems such as system 10 of FIG. 1. It would therefore be desirable to be able to provide high resolution images while also conserving processing and optical resources in system 10, without further increasing the size of display module 14A (e.g., display panel 38).

In order to provide high resolution images without undesirably burdening the resources of system 10 and without further increasing the size of display module 14A, display module 14A may be configured to perform dynamic foveation operations on light 22. Display module 14A may, for example, display portions of an image that are near the center of the user's field of view with higher resolution, whereas portions of the image that are far from the center of the user's field of view are displayed with lower resolution. As the user's gaze changes over time, display module 14A may adjust the portions of the image that are produced with the higher resolution so that that portion remains at the center of the user's gaze. Gaze tracking components (e.g., image sensors in components 18 of FIG. 1) may actively track the location of the user's gaze over time. Information about the direction of the user's gaze may be used to shift the location of the higher resolution portion of the image to follow the center of the user's gaze. The images in light 22 may thereby be foveated images (e.g., dynamically foveated images in which the higher resolution portions of the image are re-located over time to follow/track the user's gaze).

Figure 3:
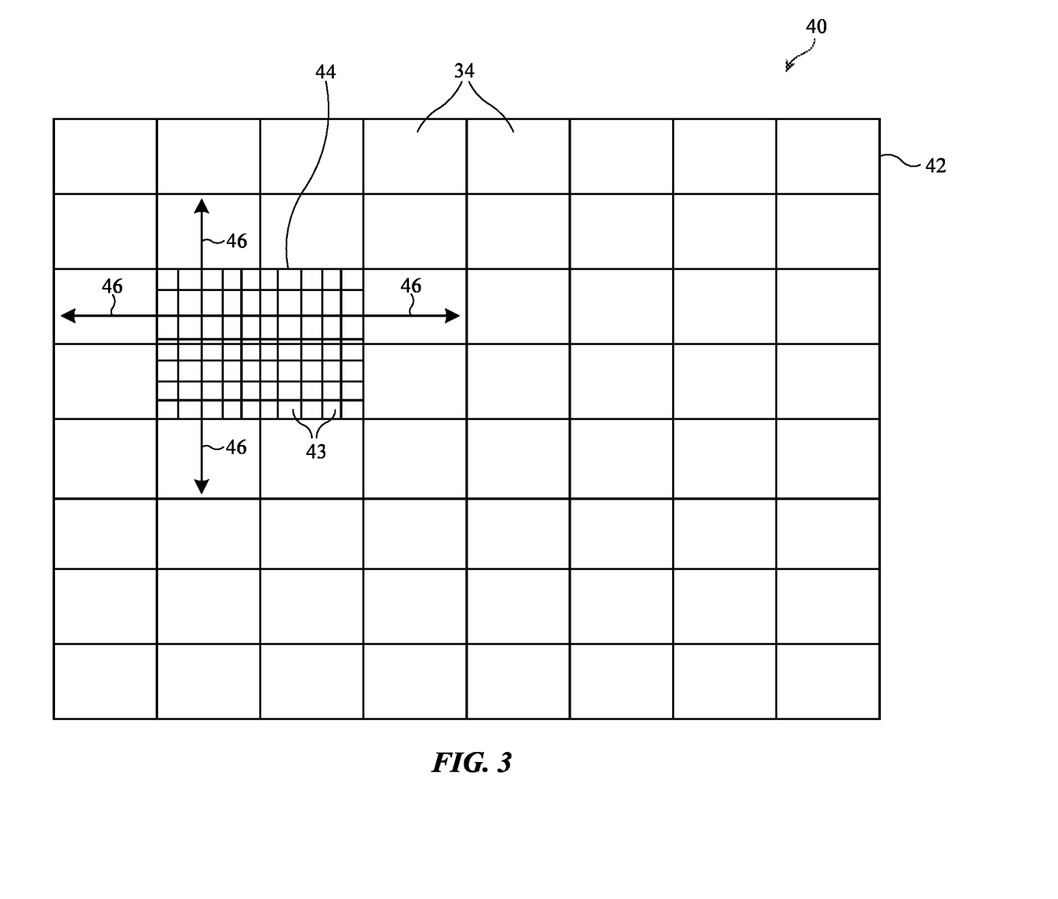
FIG. 3 is a diagram of an illustrative foveated image having an adjustable high resolution region that may be output by an optical system of the type shown in FIG. 2 in accordance with some embodiments.

FIG. 3 is a diagram showing a foveated image that may be produced by display module 14A. Light 22 of FIG. 2 may include a foveated image such as foveated image 40 of FIG. 3 (e.g., as produced by display module 14A). Foveated image 40 may include pixels 43. As shown in FIG. 3, foveated image 40 may include lower resolution pixels 43 in regions 42 (sometimes referred to herein as lower-resolution regions 42, low-resolution regions 42, or low-resolution portions 42) and higher resolution pixels 43 in region 44 (sometimes referred to herein as higher-resolution region 44, high-resolution region 44, or high-resolution portion 44). Display module 14A may, for example, optically provide the pixels in regions 42 with higher magnification and thus lower resolution and lower pixel pitch while optically providing the pixels in region 44 with lower magnification and thus higher resolution and higher pixel pitch. Regions 42 may, for example, be peripheral regions that run around the periphery of region 44 (e.g., along the periphery of the field of view of the user's gaze at any given time). Region 44 may, for example, be located at the center of the user's gaze at any given time. Components 18 of FIG. 1 may gather gaze tracking data that identifies the location of the user's gaze. As the direction of the user's gaze changes over time, control circuitry 16 (FIG. 1) may adjust display module 14A to shift the location of region 44 (e.g., based on the gaze tracking data) to align region 44 with the center of the user's gaze, as shown by arrows 46.

Because foveated image 40 has a higher resolution within region 44 than within regions 42, the user (e.g., at eye box 24 of FIG. 2) may perceive foveated image 40 as a high resolution image (e.g., because the user's eye is sensitive to the higher resolution within region 44 and is insensitive to the lower resolution within regions 42). This may allow the images displayed at eye box 24 to effectively appear as high resolution images without requiring an increase in the size of display module 14A or the processing and optical resources of system 10, even if the user shifts the direction of their gaze over time (e.g., the foveation may be dynamically performed by display module 14A without imposing any increased burden on the other components in system 10). The example of FIG. 3 is merely illustrative. Regions 44 and 42 may have any desired shapes and/or sizes. Foveated image 40 may have any desired shape and/or size and may include any desired number of pixels 43 (sometimes referred to herein as image pixels 43).

Figure 4:
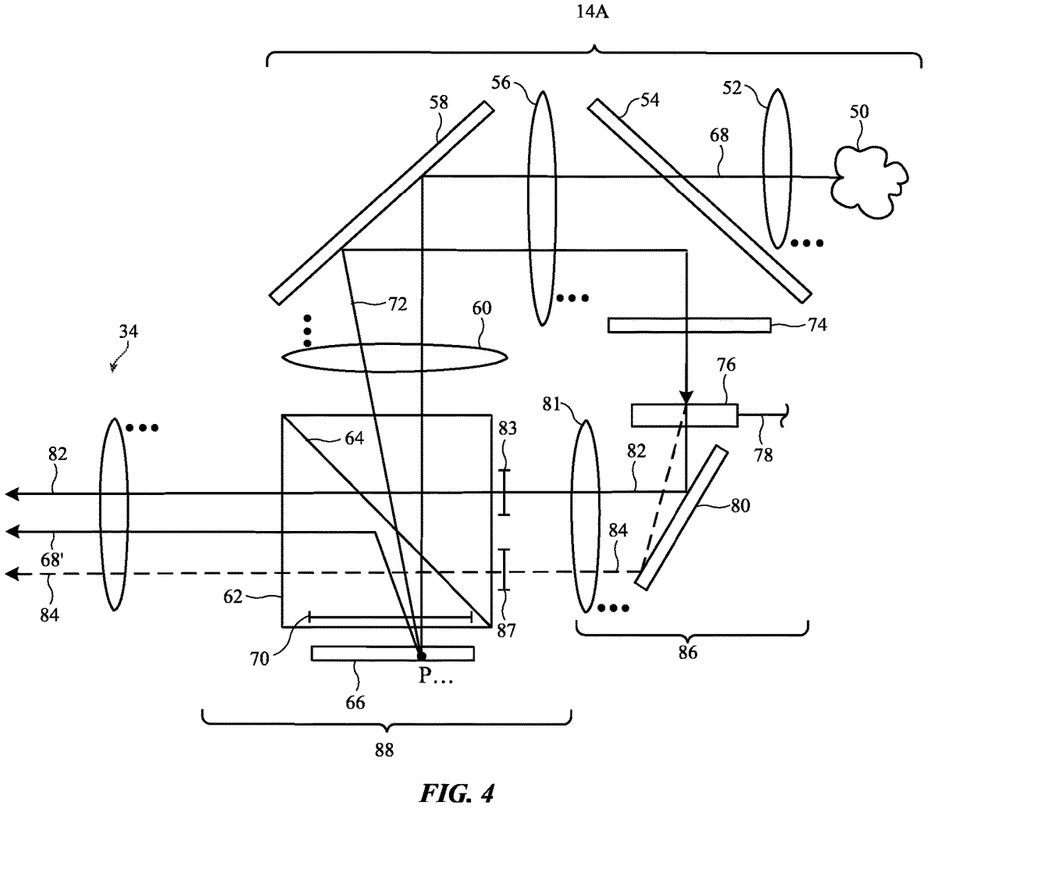
FIG. 4 is a diagram an illustrative display module having reflective display panels for producing foveated images having an adjustable high-resolution region in accordance with some embodiments.

FIG. 4 is a diagram of display module 14A in an example where display module 14A is a reflective-type display that produces foveated images such as dynamically foveated image 40 of FIG. 3. As shown in FIG. 4, display module 14A may include an illumination source such as light source 50. Light source 50 may have one or more light-emitting components (elements) for producing output light. The light-emitting elements may be, for example, light-emitting diodes (e.g., red, green, and blue light-emitting diodes, white light-emitting diodes, infrared light-emitting diodes, and/or light-emitting diodes of other colors), OLEDs, uLEDs, etc. Illumination may also be provided using light sources such as lasers (e.g., VCSELs) or lamps.

In the example of FIG. 4, display module 14A is a reflective display module such as a liquid-crystal-on-silicon (LCOS) display module, a microelectromechanical systems (MEMs) display module (sometimes referred to as digital micromirror devices (DMDs)), or other display module (e.g., spatial light modulators). An optical component such as prism 62 may be optically interposed between light source 50 and reflective display panel 66. Reflective display panel 66 is a reflective spatial light modulator and may be, for example, an LCOS display panel, a DMD panel (e.g., a panel having an array of micromirrors each corresponding to a given display pixel), etc.

Display module 14A may include primary optics 88 and secondary optics 86. Primary optics 88 (sometimes referred to herein as lower resolution optics 88 or low resolution optics 88) may include reflective display panel 66, prism 62, lens 60, mirror 58, and lens 56. Lens 60 may include one or more lens elements arranged in any desired manner Lens 56 may include one or more lens elements arranged in any desired manner Prism 62 may include a polarizing beam splitter such as polarizing beam splitter 64. Polarizing beam splitter 64 may transmit a first polarization of light while reflecting a second polarization of light. Secondary optics 86 (sometimes referred to herein as higher resolution optics 86 or high resolution optics 88) may include lens 74, optical steering element 76 (sometimes referred to herein as steerable element 76 or steerable optical element 76), mirror 80, and lens 81. Display module 14A may also include lens 52 and beam splitter 54 (e.g., a half-mirror beam splitter). Lens 52 may include one or more lens elements arranged in any desired manner Lens 74 may include one or more lens elements arranged in any desired manner Lens 81 may include one or more lens elements arranged in any desired manner Lenses 60, 56, 81, and/or 52 may be omitted if desired. Display module 14A may include other optical components (e.g., polarizers, beam splitters, mirrors, wave plates, optical coatings, lenses, lens elements, etc.) if desired.

Display module 14A of FIG. 4 may produce foveated image 40 of FIG. 3 using multiple different optical paths (e.g., a first optical path for producing low-resolution regions 42 and a second optical path that is different from the first optical path for producing high-resolution region 44). For example, a first optical path running from light source 50 to imaging optics 34 through primary optics 88 may be used produce low-resolution regions 42 of foveated image 40 whereas a second optical path running from light source 50 to imaging optics 34 through both primary optics 88 and secondary optics 86 may be used to produce high-resolution region 44 of foveated image 40. Display module 14A may produce alternating image frames using light following the first and second optical paths (e.g., such that only one of high-resolution region 44 or low-resolution regions 42 is displayed at any given time). Display module 14A may alternate between the first and second optical paths at a sufficiently high rate such that it appears to a user as though both high-resolution region 44 and low-resolution regions 42 of foveated image 40 are being displayed concurrently.

For example, as shown in FIG. 4, light source 50 may produce illumination light 68 (e.g., illumination light that includes a combination of colors such as red, green, and blue light). Illumination light 68 may pass through lens 52 (e.g., a collimating lens), through beam splitter 54, and through lens 56 to mirror 58. Illumination light 68 may reflect off of mirror 58 and pass through lens 60 and prism 62 to reflective display panel 66. If desired, a polarizer may be interposed along this optical path to provide illumination light 68 with a given polarization such that the light is transmitted through polarizing beam splitter 64 to reflective display panel 66. In another suitable arrangement, a portion of illumination light 68 may pass through polarizing beam splitter 64 without additional polarizers optically interposed between prism 62 and light source 50.

Illumination light 68 may be reflected off of different display pixels P on reflective display panel 66 to produce reflected light 68'. Reflection by reflective display panel 66 may change the polarization of the light (relative to illumination light 68) such that reflected light 68' is then reflected by polarizing beam splitter 64 towards imaging optics 34 (rather than being transmitted by polarizing beam splitter 64). Reflected light 68' passes through imaging optics 34 to waveguide 26 of FIG. 2. The light that follows this optical path (e.g., the first optical path as shown by light 68 and 68') may produce low-resolution regions 42 of foveated image 40 of FIG. 3 within a relatively large field of view 70 (e.g., a field of view that extends across the entire field of view of foveated image 40).

The illumination light may follow a different optical path (e.g., the second optical path) to produce high-resolution region 44 of FIG. 3. For example, when high-resolution region 44 is to be displayed, the polarization of the illumination light 68 reflected off of reflective display panel 66 may be adjusted (e.g., using a switchable polarizer interposed between prism 62 and reflective display panel 66 or elsewhere in the optical path) to produce reflected light 72 having a polarization that is transmitted by polarizing beam splitter 64. Reflected light 72 is then transmitted by polarizing beam splitter 64 and reflected off of mirror 58 through lens 56. Reflected light 72 then reflects off of beam splitter 54 and passes through lens 74. Lens 74 may include de-magnifying lens elements that reduce the magnification of reflected light 72 (e.g., reflected light 72 may have half the magnification or less than as incident upon lens 74). This reduction in magnification may serve to reduce the size/pitch of the image pixels in reflected light 72, thereby increasing the effective resolution of the light relative to reflected light 68'. Reflected light 72 that has passed through lens 74 may sometimes be referred to herein as de-magnified light.

Steerable element 76 may redirect reflected light 72 (e.g., the de-magnified light) in a desired direction. Steerable element 76 may be adjusted to move reflected light 72 to a desired location in foveated image 40. For example, steerable element 76 may be placed in a first state at which reflected light 72 is steered (directed) in a first direction towards mirror 80, as shown by arrow 82. In this first state, the light is reflected off of mirror 80 and all of the image pixels in the light are focused within image 83 (sometimes referred to herein as foveal image 83 or high resolution image 83). This light is then transmitted through prism 62 and polarizing beam splitter 64 to imaging optics 34 and waveguide 26 of FIG. 2, where the light forms high-resolution region 44 at a first location within foveated image 40. Similarly, steerable element 76 may be placed in a second state at which reflected light 72 is steered (directed) in a second direction towards mirror 80, as shown by dashed arrow 84. In this second state, the light is reflected off of mirror 80 and all of the image pixels in the light are focused within image 87 (sometimes referred to herein as foveal image 87 or high resolution image 87), which is spatially offset from image 83. This light is then transmitted through prism 62 and polarizing beam splitter 64 to imaging optics 34 and waveguide 26 of FIG. 2, where the light forms high-resolution region 44 at a second location within foveated image 40. By switching steerable element 76 between the first and second states, the location of high-resolution region 44 of foveated image 40 may be adjusted over time (e.g., as shown by arrows 46 in FIG. 3). For example, this adjustment may be performed to re-align high-resolution region 44 with the center of the user's gaze as the user's gaze direction changes over time (e.g., based on gaze tracking data gathered by components 18 of FIG. 1). If desired, optional polarizing elements may be interposed at any desired location(s) on the optical path of reflected light 72 to provide the light with a polarization that is transmitted by polarizing beam splitter 64 after passing through lens 81.

FIG. 4 illustrates an example where steerable element 76 has only two states for the sake of clarity. In general, steerable element 76 may have any desired number of states for steering reflected light 72 and thus high-resolution region 44 to any desired number of locations within foveated image 40. Steerable element 76 may be a liquid crystal steering element (e.g., an adjustable liquid crystal prism or other switchable liquid crystal steering device), an adjustable aperture, or any other desired steerable element that optically steers the direction of reflected light 72. The state of steerable element 76 may, for example, be controlled by control signals received over control path 78 (e.g., from control circuitry 16 of FIG. 1). This example is merely illustrative. In another suitable arrangement, steerable element 76 may be omitted and mirror 80 may be a steerable mirror (e.g., a MEMs mirror or other actuated mirror) that is steered to redirect reflected light 72 to different locations in foveated image 40. The components of primary optics 88 and/or secondary optics 86 may be arranged in other manners if desired. The light associated with arrows (rays) 82 and 84 and reflected light 68' may collectively form light 22 of FIG. 2 (e.g., light that includes foveated image 40 of FIG. 3).

In this way, display module 14A may perform dynamic foveation operations by splitting illumination light 68 between a first optical path that extends through primary optics 88 (e.g., as shown by reflected light 68') for producing low-resolution regions 42 of foveated image 40 and a second optical path that extends through secondary optics 86 in addition to primary optics 88 (e.g., as shown by reflected light 72 and arrows 82 and 84). Secondary optics 86 include a steerable element such as steerable element 76 for adjusting the location of high-resolution region 44 of foveated image 40 (e.g., so that the user continues to see a high resolution image at the center of their gaze regardless of their gaze direction over time). Because the remainder of the image is provided with a lower resolution (e.g., low-resolution regions 42), this may allow the user to perceive higher resolution images without undesirably increasing the size of reflective display panel 66 and prism 62 to accommodate all of the pixels that would otherwise be necessary to produce such high resolution images.

Figure 5:
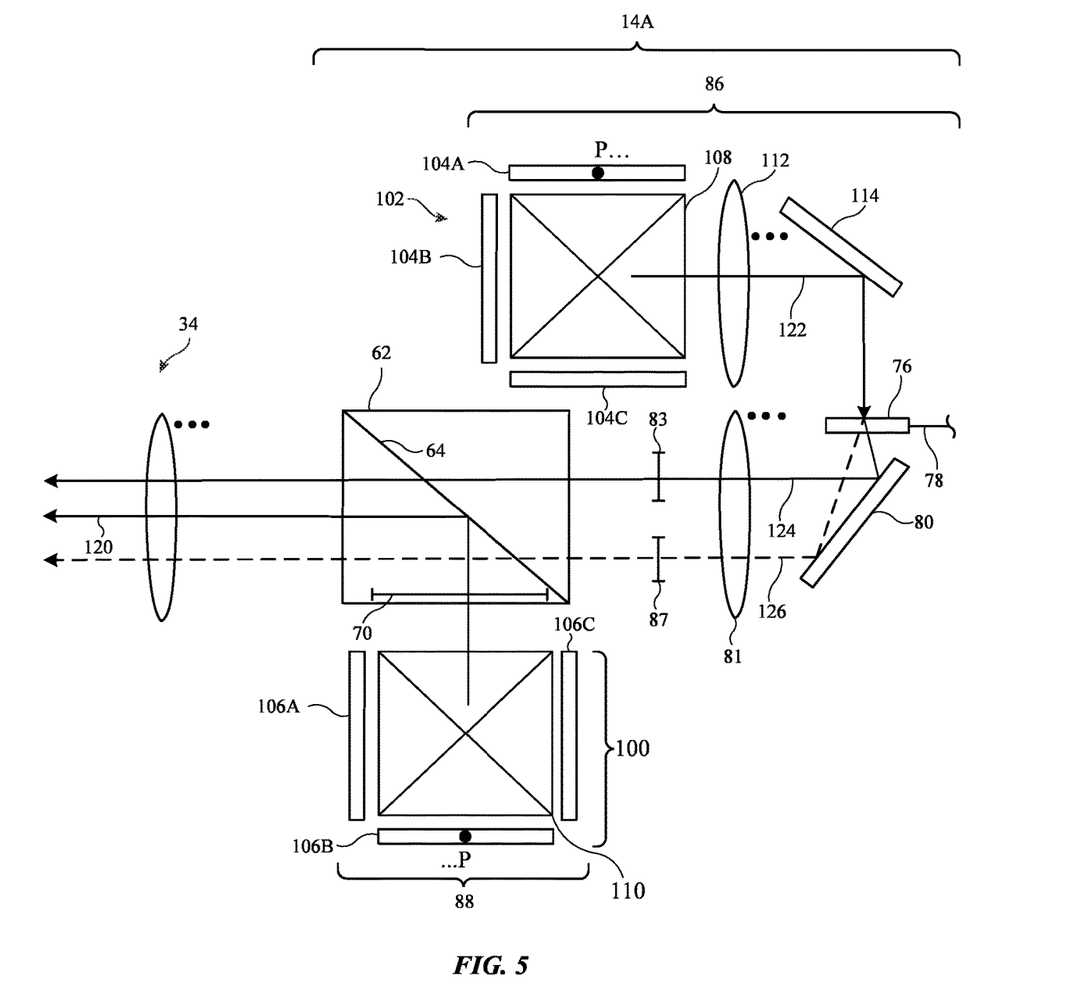
FIG. 5 is a diagram of an illustrative display module having emissive display panels for producing foveated images having an adjustable high-resolution region in accordance with some embodiments.

The example of FIG. 4 in which display module 14A includes a reflective display panel is merely illustrative. In another suitable arrangement, display module 14A may include emissive display panels for producing foveated image 40. FIG. 5 is a diagram showing how display module 14A may include emissive display panels. As shown in FIG. 5, primary optics 88 may include illumination optics 100, prism 62, and polarizing beam splitter 64. Secondary optics 86 may include illumination optics 102, lens 112, mirror 114, steerable element 76, mirror 80, and lens 81.

Illumination optics 100 may include emissive display panels 106 and prism 110. Emissive display panels 106 may include arrays of emissive light sources such as LEDs, OLEDs, uLEDs, lasers, etc. Emissive display panels 106 in illumination optics 100 may include a first emissive display panel 106A, a second emissive display panel 106B, and a third emissive display panel 106C. Emissive display panels 106A, 106B, and 106C may each emit illumination light 120 of a corresponding wavelength range (e.g., color). For example, emissive display panel 106A may emit red light, emissive display panel 106B may emit green light, and emissive display panel 106C may emit blue light. Prism 110 may combine the light emitted by emissive display panels 106A, 106B, and 106C into illumination light 120 (e.g., illumination light 120 may include red, green, and blue light, etc.). Illumination light 120 is reflected off of polarizing beam splitter towards illumination optics 34. Polarizers may be interposed on the optical path of illumination light 120 (e.g., between the arrays of light sources and prism 110, between prism 62 and prism 110, etc.) to provide illumination light 120 with a given polarization that is reflected (rather than transmitted) by polarizing beam splitter 64. Emissive display panels 106A, 106B, and 106C may each include arrays of display pixels P (e.g., where each emissive light source in the panel forms a respective display pixel). Display pixels P produce the image pixels 43 of low-resolution regions 42 in foveated image 40 of FIG. 3 (e.g., illumination light 120 may form low-resolution regions 42 of foveated image 40 in the light 22 that is provided to waveguide 26 of FIG. 2).

Illumination optics 102 may include emissive display panels 104 and prism 108. Emissive display panels 104 may include arrays of emissive light sources such as LEDs, OLEDs, uLEDs, uOLEDs, lasers (e.g., VCSELs), etc. Emissive display panels 104 in illumination optics 102 may include a first emissive display panel 104A, a second emissive display panel 104B, and a third emissive display panel 104C. Emissive display panels 104A, 104B, and 104C may each emit illumination light 122 of a corresponding wavelength range (e.g., color). For example, emissive display panel 104A may emit red light, emissive display panel 104B may emit green light, and emissive display panel 104C may emit blue light. Emissive display panels 104A, 104B, and 104C may each include arrays of display pixels P (e.g., where each emissive light source in the panel forms a respective pixel). Display pixels P produce the image pixels 43 of high-resolution region 44 in foveated image 40 (e.g., illumination light 120 may form high-resolution region 44 of foveated image 40 in the light 22 that is provided to waveguide 26 of FIG. 2).

Prism 108 may combine the light emitted by emissive display panels 104A, 104B, and 104C into illumination light 122 (e.g., illumination light 122 may include red, green, and blue light, etc.). Illumination light 122 is transmitted through lens 112. Lens 112 may include de-magnifying lens elements that reduce the magnification of illumination light 122 (e.g., illumination light 122 may have half the magnification or less after passing through lens 112 than as incident upon lens 112). This reduction in magnification may serve to reduce the size/pitch of the image pixels in illumination light 122, thereby increasing the effective resolution of the light (relative to illumination light 120). After de-magnification by lens 112, illumination light 122 is reflected off of mirror 114 towards steerable element 76.

Steerable element 76 may redirect illumination light 122 in a desired direction. Steerable element 76 may be adjusted to move illumination light 122 to a desired location in foveated image 40. For example, steerable element 76 may be placed in a first state at which illumination light 122 is steered (directed) in a first direction towards mirror 80, as shown by arrow 124. In this first state, the light is reflected off of mirror 80 and all of the image pixels in the light are focused within image 83. This light is then transmitted through prism 62 and polarizing beam splitter 64 to imaging optics 34 and waveguide 26 of FIG. 2 (e.g., the light following arrow 124 may have a polarization that is transmitted by polarizing beam splitter 64), where the light forms high-resolution region 44 at a first location within foveated image 40. Similarly, steerable element 76 may be placed in a second state at which illumination light 122 is steered (directed) in a second direction towards mirror 80, as shown by dashed arrow 126. In this second state, the light is reflected off of mirror 80 and all of the image pixels in the light are focused within image 87, which is spatially offset from image 83. This light is then transmitted through prism 62 and polarizing beam splitter 64 to imaging optics 34 and waveguide 26 of FIG. 2 (e.g., the light following arrow 124 may have a polarization that is transmitted by polarizing beam splitter 64), where the light forms high-resolution region 44 at a second location within foveated image 40. By switching steerable element 76 between the first and second states, the location of high-resolution region 44 of foveated image 40 may be adjusted over time (e.g., as shown by arrows 46 in FIG. 3). For example, this adjustment may be performed to re-align high-resolution region 44 with the center of the user's gaze as the user's gaze changes over time (e.g., based on gaze tracking data gathered by components 18 of FIG. 1). If desired, optional polarizing elements may be interposed at any desired location(s) on the optical path of illumination light 122 to provide illumination light 122 with a polarization that is transmitted by polarizing beam splitter 64.

FIG. 5 illustrates an example where steerable element 76 has only two states for the sake of clarity. In general, steerable element 76 may have any desired number of states for steering reflected light 72 and thus high-resolution region 44 to any desired number of locations within foveated image 40. Steerable element 76 may be a liquid crystal steering element (e.g., an adjustable liquid crystal prism), an adjustable aperture, or any other desired steerable element that steers the direction of reflected light 72. The state of steerable element 76 may, for example, be controlled by control signals received over control path 78 (e.g., from control circuitry 16 of FIG. 1). This example is merely illustrative. In another suitable arrangement, steerable element 76 may be omitted and mirror 80 may be a steerable mirror (e.g., a MEMs mirror or other actuated mirror) that is steered to redirect illumination light 122 to different locations in foveated image 40. The components of primary optics 88 and/or secondary optics 86 may be arranged in other manners if desired.

Forming primary optics 88 and secondary optics 86 using emissive display panels rather than reflective display panels may allow display module 14A to concurrently display both the high-resolution region 44 of foveated image 40 (e.g., using secondary optics 86, primary optics 88, and illumination light 122) and the low-resolution regions 42 of foveated image 40 (e.g., using primary optics 88 and illumination light 120), whereas the reflective display module of FIG. 4 only displays either the high resolution region or the low resolution regions at any given time while alternating between the two faster than the response speed of the human eye. Even though emissive display panels are used in FIG. 5 rather than reflective display panels, display module 14A still performs dynamic foveation operations by splitting illumination light 68 between a first optical path that extends through primary optics 88 (e.g., as shown by illumination light 120) for producing low-resolution regions 42 of foveated image 40 and a second optical path that extends through secondary optics 86 in addition to primary optics 88 (e.g., as shown by illumination light 122 and rays 124 and 126). Secondary optics 86 include a steerable element such as steerable element 76 for adjusting the location of high-resolution region 44 of foveated image 40 (e.g., so that the user continues to see a high resolution image at the center of their gaze regardless of their gaze direction over time). Because the remainder of the image is provided with a lower resolution (e.g., low-resolution regions 42), this may allow the user to perceive higher resolution images without undesirably increasing the size of reflective display panel 66 and prism 62 to accommodate all of the pixels that would otherwise be necessary to produce such high resolution images.

For example, even though display module 14A of FIGS. 4 and 5 include secondary optics 86 in addition to primary optics 88 for generating image light with high-resolution region 44, the volume of secondary optics 86 in addition to the volume of primary optics 88 is still less than the volume that would otherwise be required if reflective display panel 66 (FIG. 4) or emissive display panels 106A-106C (FIG. 5) were to be modified to include sufficient space to fill the entire field of view of image 40 with pixels of the same resolution as high-resolution region 44. By performing dynamic foveation in which high-resolution region 44 tracks the user's gaze over time, the image presented to the user at the eye box effectively appears the same to the user as if the entire image were generated with higher resolution pixels. This may serve to optimize the apparent image quality of the display to the user while also allowing display module 14A to occupy a relatively small amount of volume, thereby minimizing the volume of system 10.

Figure 6:
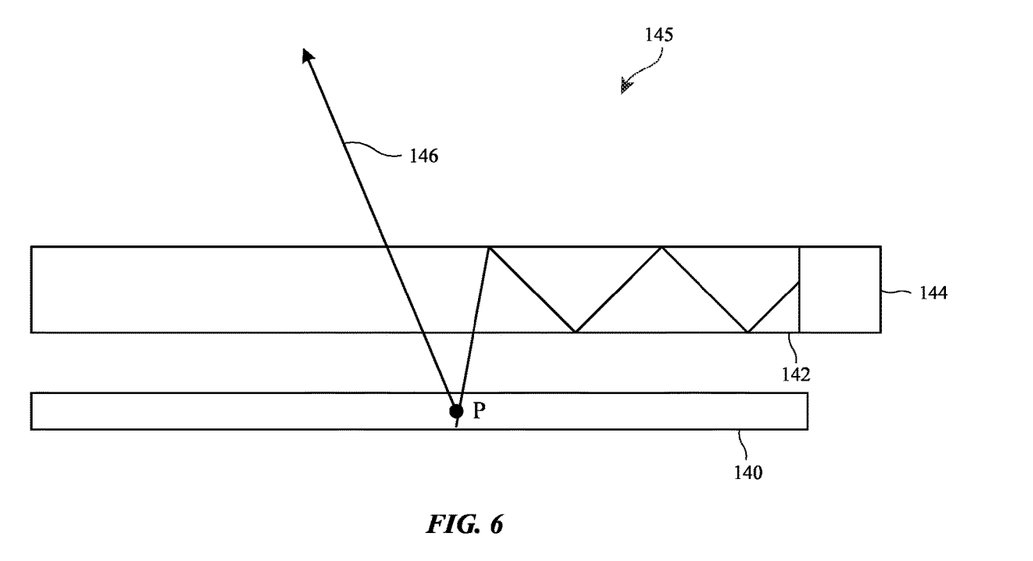
FIG. 6 is a diagram of an illustrative front-illuminated reflective display panel that may be used in a display module of the type shown in FIG. 5 in accordance with some embodiments.

If desired, emissive display panels 104 and 106 of FIG. 5 may be replaced with front-illuminated reflective display panels. FIG. 6 is a diagram of a front-illuminated reflective display panel that may be used to replace one or more of emissive display panels 106A, 106B, 106C, 104A, 104B, and 104C of FIG. 5. As shown in FIG. 6, front-illuminated reflective display panel 145 may include a reflective display panel 140, a light guide 142 overlapping reflective display panel 140, and light sources 144. Reflective display panel 140 may be an LCOS panel or other reflective display panel. Light sources 144 may, for example, include LEDs (e.g., red, green, and blue LEDs). Light sources 144 may emit light 146 into light guide 142 (e.g., via a side edge or input face of light guide 142). Light 146 may propagate down the length of light guide 142 via total internal reflection. Light 146 may be coupled out of light guide 142 and towards reflective display panel 140 at different points along the length (area) of light guide 142 (e.g., when the incident angle of the light no longer supports total internal reflection or when the light encounters output coupling features on or in light guide 142). Light 146 may reflect off of different display pixels P in reflective display panel 140 and towards prism 110 or prism 108 of FIG. 5 (e.g., as a portion of illumination light 120 or 122 of FIG. 5).

In accordance with an embodiment, a display system configured to display a foveated image having a first region with a first resolution and a second region with a second resolution greater than the first resolution, the display system is provided that includes an optical system configured to direct the foveated image towards an eye box, a light source that produces illumination light, a reflective display panel, during a first time period, the reflective display panel is configured to reflect the illumination light as first reflected light, and during a second time period different from the first time period, the reflective display panel is configured to reflect the illumination light as second reflected light, a polarizing beam splitter, the polarizing beam splitter is configured to reflect the first reflected light towards the optical system as the first region of the foveated image, and the polarizing beam splitter is configured to transmit the second reflected light, a lens configured to de-magnify the second reflected light transmitted by the polarizing beam splitter to produce de-magnified light, and an optical steering element configured to re-direct the de-magnified light through the polarizing beam splitter and towards the optical system as the second region of the foveated image.

In accordance with another embodiment, the display system includes control circuitry, the control circuitry is configured to adjust the optical steering element to change a location of the second region in the foveated image.

In accordance with another embodiment, the optical steering element includes an adjustable mirror.

In accordance with another embodiment, the display system includes a mirror, the optical steering element is configured to re-direct the de-magnified light towards the mirror and the mirror is configured to reflect the de-magnified light through the polarizing beam splitter and towards the optical system as the second region of the foveated image.

In accordance with another embodiment, the optical steering element includes a switchable liquid crystal steering device.

In accordance with another embodiment, the display system includes a gaze tracking sensor, the gaze tracking sensor is configured to gather gaze tracking data that identifies a gaze direction at the eye box, and the control circuitry is configured to adjust the optical steering element to align the location of the second region with the gaze direction identified by the gaze tracking data.

In accordance with another embodiment, the reflective display panel includes a liquid crystal on silicon (LCOS) display panel.

In accordance with another embodiment, the reflective display panel includes a digital-micromirror device display panel.

In accordance with another embodiment, the display system includes a mirror, the mirror is configured to reflect the illumination light towards the polarizing beam splitter and the mirror is configured to reflect the second reflected light transmitted by the polarizing beam splitter towards the lens, and a partial mirror, the partial mirror is configured to transmit the illumination light, the partial mirror is configured to receive the second reflected light from the mirror, and the partial mirror is configured to reflect the second reflected light towards the lens.

In accordance with another embodiment, the lens is optically interposed between the partial mirror and the optical steering element, the mirror is optically interposed between the partial mirror and the polarizing beam splitter, and the polarizing beam splitter is optically interposed between the mirror and the reflective display panel.

In accordance with another embodiment, the optical system includes a waveguide having an input coupler configured to couple the foveated image into the waveguide and an output coupler configured to couple the foveated image out of the waveguide and towards the eye box.

In accordance with another embodiment, the first reflected light does not pass through the lens and is not redirected by the optical steering element.

In accordance with an embodiment, a display system configured to display a foveated image having a first region with a first resolution and a second region with a second resolution greater than the first resolution, the display system is provided that includes an optical system configured to direct the foveated image towards an eye box, a polarizing beam splitter, a first set of emissive display panels configured to produce first illumination light, the polarizing beam splitter is configured to reflect the first illumination light towards the optical system as the first region of the foveated image, a second set of emissive display panels configured to produce second illumination light, a lens configured to de-magnify the second illumination light to produce de-magnified light, and an optical steering element configured to re-direct the de-magnified light towards the polarizing beam splitter, the polarizing beam splitter is configured to transmit the de-magnified light re-directed by the optical steering element, and the de-magnified light re-directed by the optical steering element forms the second region of the foveated image.

In accordance with another embodiment, the optical steering element has a first state at which the de-magnified light is re-directed in a first direction and at which the second region is at a first location in the foveated image, and the optical steering element has a second state at which the de-magnified light is re-directed in a second direction different from the first direction and at which the second region is at a second location in the foveated image that is different from the first location.

In accordance with another embodiment, the display system includes control circuitry configured to control the optical steering element to switch between the first and second states.

In accordance with another embodiment, the first set of emissive display panels includes first, second, and third micro light-emitting-diode (uLED) arrays, and the second set of emissive display panels includes fourth, fifth, and sixth uLED arrays.

In accordance with another embodiment, the first set of emissive display panels includes first, second, and third laser arrays, and the second set of emissive display panels includes fourth, fifth, and sixth laser arrays.

In accordance with another embodiment, the display system includes a first mirror configured to receive the de-magnified light from the lens and configured to reflect the de-magnified illumination light towards the optical steering element, and a second mirror configured to receive the de-magnified light re-directed by the optical steering element and configured to reflect the de-magnified light towards the polarizing beam splitter.

In accordance with an embodiment, a display system configured to display a foveated image having a first region with a first resolution and a second region with a second resolution greater than the first resolution, the display system is provided that includes an optical system configured to direct the foveated image towards an eye box, a polarizing beam splitter, a first set of front-lit reflective display panels configured to produce first illumination light, the polarizing beam splitter is configured to reflect the first illumination light towards the optical system as the first region of the foveated image, a second set of front-lit reflective display panels configured to produce second illumination light, a lens configured to de-magnify the second illumination light to produce de-magnified light, and an optical steering element configured to re-direct the de-magnified light towards the optical system through the polarizing beam splitter, the de-magnified light re-directed by the optical steering element forms the second region of the foveated image.

In accordance with another embodiment, each front-lit reflective display panels in the first set includes a liquid crystal on silicon (LCOS) display panel, a light source that produces light, and a light guide that propagates the light produced by the light source via total internal reflection, the light guide is configured to couple the light produced by the light source out of the light guide and towards the LCOS display panel, and the LCOS display panel is configured to produce the first illumination light by reflecting the light coupled out of the light guide.

The foregoing is merely illustrative and various modifications can be made to the described embodiments. The foregoing embodiments may be implemented individually or in any combination.

What is claimed is:

1. A display system configured to display a foveated image having a first region with a first resolution and a second region with a second resolution greater than the first resolution, the display system comprising:
an optical system configured to direct the foveated image;
a light source that produces illumination light;
a reflective display panel, wherein:
during a first time period, the reflective display panel is configured to reflect the illumination light as first reflected light, and
during a second time period different from the first time period, the reflective display panel is configured to reflect the illumination light as second reflected light;
a polarizing beam splitter, wherein:
the polarizing beam splitter is configured to reflect the first reflected light towards the optical system as the first region of the foveated image, and
the polarizing beam splitter is configured to transmit the second reflected light;
a lens configured to receive the second reflected light transmitted by the polarizing beam splitter and configured to de-magnify the second reflected light transmitted by the polarizing beam splitter to produce de-magnified light; and
an optical steering element configured to re-direct the de-magnified light through the polarizing beam splitter and towards the optical system as the second region of the foveated image.

2. The display system of claim 1, further comprising:
control circuitry, wherein the control circuitry is configured to adjust the optical steering element to change a location of the second region in the foveated image.

3. The display system of claim 2, wherein the optical steering element comprises an adjustable mirror.

4. The display system of claim 2, further comprising:
a mirror, wherein the optical steering element is configured to re-direct the de-magnified light towards the mirror and wherein the mirror is configured to reflect the de-magnified light through the polarizing beam splitter and towards the optical system as the second region of the foveated image.

5. The display system of claim 4, wherein the optical steering element comprises a switchable liquid crystal steering device.

6. The display system of claim 4, further comprising an additional lens, wherein the lens is optically interposed between the mirror and the polarizing beam splitter.

7. The display system of claim 6, further comprising a polarizing element, wherein the polarizing element is optically interposed between the additional lens and the polarizing beam splitter.

8. The display system of claim 7, wherein the polarizing element is configured to provide the de-magnified light with a polarization that is transmitted by the polarizing beam splitter.

9. The display system of claim 2, further comprising:
a gaze tracking sensor, wherein the gaze tracking sensor is configured to gather gaze tracking data that identifies a gaze direction, and wherein the control circuitry is configured to adjust the optical steering element to align the location of the second region with the gaze direction identified by the gaze tracking data.

10. The display system of claim 1, wherein the reflective display panel comprises a liquid crystal on silicon (LCOS) display panel.

11. The display system of claim 1, wherein the reflective display panel comprises a digital-micromirror device display panel.

12. The display system of claim 1, further comprising:
a mirror, wherein the mirror is configured to reflect the illumination light towards the polarizing beam splitter and wherein the mirror is configured to reflect the second reflected light transmitted by the polarizing beam splitter towards the lens; and
a partial mirror, wherein the partial mirror is configured to transmit the illumination light, wherein the partial mirror is configured to receive the second reflected light from the mirror, and wherein the partial mirror is configured to reflect the second reflected light towards the lens.

13. The display system of claim 12, wherein the lens is optically interposed between the partial mirror and the optical steering element, wherein the mirror is optically interposed between the partial mirror and the polarizing beam splitter, and wherein the polarizing beam splitter is optically interposed between the mirror and the reflective display panel.

14. The display system of claim 1, wherein the optical system comprises a waveguide having an input coupler configured to couple the foveated image into the waveguide and an output coupler configured to couple the foveated image out of the waveguide.

15. The display system of claim 1, wherein the first reflected light does not pass through the lens and is not redirected by the optical steering element.

16. The display system of claim 1, further comprising:
a waveguide configured to propagate the first reflected light via total internal reflection and configured to propagate the de-magnified light via total internal reflection.

17. The display system of claim 16, wherein the waveguide comprises surface relief gratings.

18. The display system of claim 1, wherein the optical steering element has a first state in which the de-magnified light is re-directed in a first direction and in which the second region is at a first location in the foveated image, and wherein the optical steering element has a second state in which the de-magnified light is re-directed in a second direction different from the first direction and in which the second region is at a second location in the foveated image that is different from the first location.

19. The display system of claim 18, further comprising control circuitry configured to control the optical steering element to switch between the first and second states.

20. The display system of claim 1, further comprising a prism, wherein the prism is optically interposed between the light source and the reflective display panel.

* * * * *